D. G. LITTLEFIELD.
Base Burning Stove.
No. 1,813.
Reissued Nov. 8, 1864.
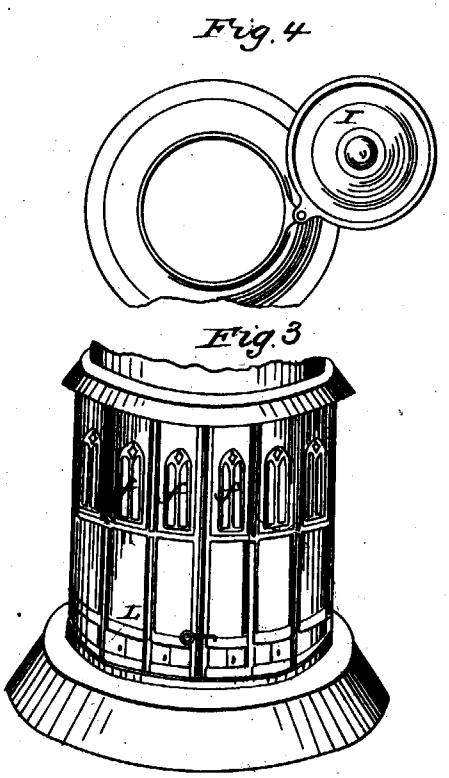
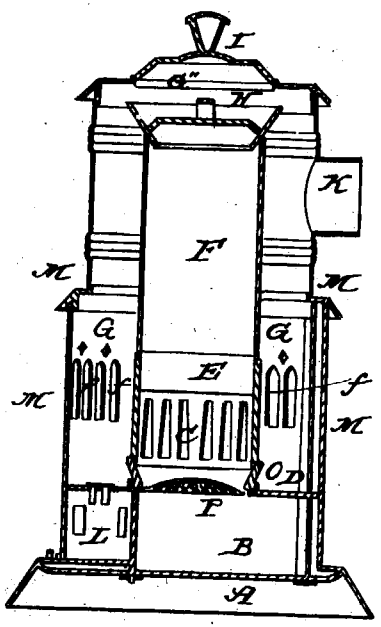
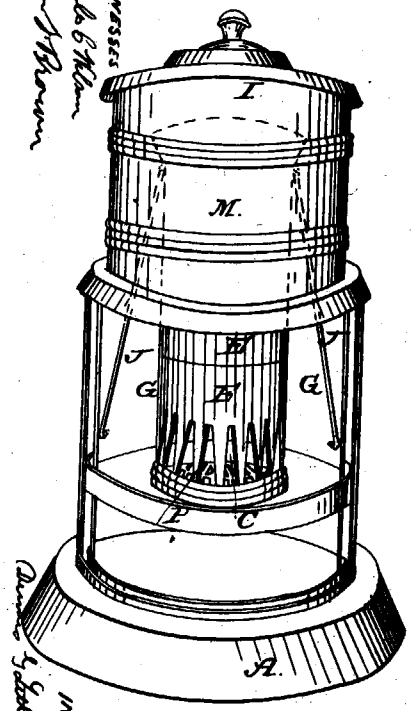
N. PETERS, Photo-Lithographer, Washington, D. C.

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated Januar 24, 1854; Reissue No. 1,237, datedy November 19, 1861; Reissue No. 1,335, dated August 26, 1862; Reissue No. 1,426, dated March 3, 1863; Reissue No. 1,813, dated November 8, 1864.

DIVISION No. 1.

*To all whom it may concern:*

Be it known that I, DENNIS G. LITTLEFIELD, of Albany, in the county of Albany and State of New York, have invented new and useful Improvements in Stoves for Burning Anthracite and other Concentrated Fuels; and I do hereby declare the following to be a full, clear, and exact description of my invention, when taken in connection with the accompanying drawings, and the letters of reference marked thereon, and which said drawings constitute part of this specification, and represent, in—

Figure 1, a perspective view of a cylindrical stove, a section of the outside casing removed to show the fire-pot; Fig. 2, a vertical central section of Fig. 1, showing the combination and arrangement of the various parts and their connection and adaptation to each other as here organized; Fig. 3, an illuminating-case, showing the arrangement thereof when combined with a stove in which a portion of its surface would be concealed by being placed against a wall, or otherwise.

Similar letters indicate corresponding parts in the several figures.

My invention relates to improvements in stoves which are supplied with an excess of fuel and the excess or reserve fuel fed to the fire as fast as consumption takes place, and has for its object the arrangement, adaptation, and permanent connection as a manufactured article of the organic parts of a fuel-supplying cylinder-stove, having its supplying-cylinder so adapted to the chamber or space designed to receive and convey to the chimney flue the gaseous products of combustion from the burning fuel as shall not only effectually prevent all danger of premature ignition of the reserve-fuel, or of "puffs" and explosion, but will permit of the accumulation of the volatile products of imperfect combustion within the supplying-cylinder and among the interstices of the supply-coal in such a manner as to insure the proper action of a stove designed for the combustion of anthracite and other concentrated fuels, requiring to be burned at a high temperature.

To enable those skilled in the art to fully understand my invention, I will proceed to describe the same in connection with the accompanying drawings.

A is the base or bottom of the stove, above which is the ash-pit B, thus formed by an annular plate, D, which is permanently secured to other parts of the stove, so as to form the said ash-pit separate and distinct from chambers above. Said ash-pit is provided with a register, L, to regulate the supply of air to support combustion, which air, owing to the complete separation of said ash-pit from chambers above, and its permanent connection to other parts of the stove, must necessarily pass up through the fire to support combustion, and not to chambers outside of the fire-pot, to cool the stove, as would be the case, more or less, were not said ash-pit permanently connected, as here described. Resting upon the plate D is a ring, O, which forms the lower part of the fire-pot E. The said ring is constructed with a flange extending upward far enough to receive the upper part of the fire-pot E; is retained in a central position on the plate D by a flange extending upward therefrom for that purpose. The said fire-pot is constructed with vertical openings C around its entire circumference, in height about one-half its diameter, and made narrower at the top than at the bottom. This form tends to draw the point of active combustion lower down, and cause the hottest part of the fire to be at the base of the incandescent fuel. The fire-grate P, at the bottom of said fire-pot, rests upon the plate D, on a line with the bottom of the ring O, and may be of the form represented, or any other form, if preferred.

F is the fuel-supplying cylinder, placed over and rests upon the fire-pot E, and is secured in place by stay-rods *j j* or other suitable device. It should be made sufficiently high to contain at all times a full supply of unignited coal, upon which the fresh and cold fuel may be thrown without the disadvantage which would attend the introduction of such fuel into an intensely-heated chamber. The fuel thus introduced falls upon that already contained in the supplying-cylinder and gradually descends as the lower portion of the mass, or that contained in the fire-pot, is consumed, and in its descent becomes gradually heated and prepared for a more perfect combustion than if permitted to come at once to the point of ignition without being heated. The said supplying-cylinder is provided with a cover, H, which should be kept closed when the stove is in operation, but which may be made to fit loosely like an ordinary cover so that a portion of the steam and light gases generated and thrown off by the heating of the reserve-fuel may by pressure escape, as occasion may require, without establishing a current sufficient to cause the gaseous products of combustion from the fire-pot to pass in that direction, and to guard against such improper action of the supplying-cylinder the outlet-space from the fire-pot to the chamber G, receiving the gaseous products of combustion, should be sufficiently large or capacious to allow such a free passage therefrom to said chamber as will avoid a draft upward through the reserve-fuel, and to insure such proper working of the fire pot or place where the fuel is burned, the aggregate amount of opening from the fire-pot to the chamber G should be greater than the aggregate amount of openings through the fire-grate P, in order to permit a free passage of all those gaseous products to the chamber designed to receive and convey them to the chimney-flue.

When wet fuel or coal of a poor quality is placed in the supplying cylinder, or when the entire quantity therein contained has become heated, the generation of hydrogenated or carbureted-hydrogen gas is liable to take place, which, by the admixture of atmospheric air, will produce explosion. To effectually avoid such explosion, as well as any liability to prematurely ignite the reserve-fuel, I inclose the cover-opening in the supplying-cylinder within a chamber, G″, which communicates directly with the chamber G and also with the smoke-flue K, so that no atmospheric air can by any possibility pass in at the top of the supplying-cylinder when the stove is in operation. I form the chamber G″ around the cover of the supplying-cylinder by extending the casing M M, which forms the exterior of the chamber G, up so as to surround the top of the supplying-cylinder, (or at least to entirely inclose the cover-opening thereto,) and so as to communicate with the chamber G and with the smoke flue K, as seen in Fig. 2. Thus constructed, the supplying-cylinder, or at least that portion which contains cover-opening, is inclosed within a chamber which is made vacuous in consequence of its connection with the flue which leads to the chimney, thus making it impossible (when in operation) for the external atmosphere to find access to the supplying-cylinder, as the air will, at the moment of its entrance to the chamber G″, pass directly to the exit or smoke flue K, that being the vacuous space. The chamber G″ is provided with an opening and cover, I, through which the cover H may be removed to supply fresh fuel, or as occasion may require.

By the organization here described a stove when in operation has its supplying-cylinder always filled, either with reserve-coal, having its interstices near to and at the point of ignition filled with the volatile products of imperfect combustion and at higher points with lighter gases, vapor, or steam, varying according to the condition and quality of the fuel, or when the supply-coal is so nearly exhausted that the quantity unconsumed has become thoroughly dry and heated. Gases are generated so as to fill whatever space there may be within the cylinder above the supply-coal, so that at all times a volatile combustible is passing down to the fire-pot to continue and perpetuate an intensity of combustion therein and at the exterior surface, insuring a complete combustion of the incandescent coal by burning the volatile combustible in connection therewith, and thereby aiding in the proper action of the stove, whence arises one of the principal advantages of so entirely preventing the entrance of air at the top of the supplying-cylinder as to permit a volatile combustible to accumulate therein, and thereafter aid in the combustion of the incandescent coal within the fire-pot.

The defective action of a stove intended to burn at the base, and not protected against all possibility of the entrance of air to the supplying-cylinder will be apparent to those familiar with the philosophy of combustion and the chemical proprieties of concentrated fuels. Nothing can be more certain than that the gases generated from heated coals will ignite and cause explosion upon the mingling therewith of the necessary quantity of atmospheric air to form a chemical union, but the most serious objection to a construction which will permit even a small quantity of air to pass in at the top of its supplying-cylinder, when the stove is in operation, is that such stoves cannot be controlled in their action by a register to regulate the quantity of air passing in at the base of the incandescent fuel, as, if the cover-opening to the supplying-cylinder communicates with the external atmosphere, and the supply to the fire-pot from below be partially or wholly cut off, the vacuous space of the chimney-flue will be more powerful to draw the external atmosphere in under the cover-opening to said cylinder. Even when the register for supplying air to the fire from below is left entirely open, and the flue of the chimney has a powerful draft, more or less atmospheric air will be drawn in under said cover, though it may be fitted very perfectly, which air, though it may be quite small in quantity passing in, will accumulate within the cylinder until the proper quantity is present to produce a chemical union or combustion of the gases therein, resulting in a puff or an explosion, which will raise the cover sufficiently to permit not only the products of such combustion to escape, but other gases not explosive (except at a much higher degree of heat) to be forced out with them to poison the atmosphere of the room in which the stove is situated.

With such stoves puffs, explosion, and the escape of gases can only be avoided by keeping the supplying-cylinder so nearly filled with coal that explosive gases cannot be generated; but to do this a difficulty of a more serious nature arises, as, if the air thus drawn into the supplying-cylinder does not find a heated volatile combustible with which to combine and impart its oxygen, it will pass down through the supply coal until it meets the highly-heated and ignited coals at the top of the fire pot or at the base of the supplying-cylinder, where it combines and intensifies combustion at that point, so that the coal soon becomes ignited at a point higher up in the supplying-cylinder, ignition taking place as air is drawn in and down through the supply-coal, until finally the whole mass of supply-coal will become ignited and burning, and the action of the stove, so far as to regulating the amount of coal ignited and heat evolved, will be entirely beyond control.

To obviate the difficulty in such stoves of explosions and premature ignition of the supply-coal, resort has been had to various expedients. In some instances a damper in the exit-pipe has been used with a view to regulate the draft of the chimney by reducing or increasing the size of the channel communicating with the chimney, as occasion required. In other instances the well-known cold-air draft, sometimes called a "ventilator," has been adopted with a view to check and regulate the draft of the chimney flue by the admission of cold air to the said flue, but in proportion as the draft of a chimney is variable such expedients utterly fail to obviate the difficulty, and even were the draft of the chimney without variableness, with such radical defect in the construction of the stove, it would be difficult, if not impossible, to establish such an equilibrium between the draft of the chimney-flue and the air-supplying register to support combustion within the fire-pot as will prevent the passage of air to the supplying-cylinder under the cover-opening thereto, without so far checking the draft of the chimney as to cause the gaseous products of combustion from the fire-pot to be kept back in the stove, so as to completely fill its space and cause them to be forced out through its open joints to poison the air of the room, and so fill the space in the supplying-cylinder above the supply-coal with gases, smoke, and steam arising from the supply-coal as to cause them to escape from under its cover to the room in which the stove is situated.

The draft of a chimney-flue, when more than sufficient to insure the proper working of a stove, may be checked by the use of a damper or its equivalent, but under no circumstances should it become necessary to check such draft in order to remedy a defect in the construction of a stove or to regulate its action further than to economize the heat produced thereby. The stove, as a complete individual thing, should be so organized as to contain within itself all the elements necessary to its successful operation, which is the final object of my invention.

Heretofore inventors in this class of stoves have confined their efforts to the fire-pot flues and radiating-surfaces, assuming that the supplying-cylinder or magazine was not susceptible of improvement. As a natural result of such efforts, stoves employing a supplying-cylinder for reserve-fuel heretofore constructed and used for warming the air in buildings have contained the one radical defect here pointed out, and which my invention, as described, entirely obviates.

The organization herein exemplified may be put in operation in the following manner, to wit: Remove the cover I, through which opening the cover H may be reached, remove the cover H, place the requisite kindlings through the said openings into the fire-pot, then close the cover I, leaving the top of the supplying-cylinder open. Open the air-register L, ignite the kindlings in the usual manner through the ash-pit; allow the kindlings, &c., to burn up through the supplying-cylinder until the smoke has passed off and the chimney-flue has become sufficiently heated to establish a proper draft, after which the fuel-supplying cylinder may be filled with coal and the cover-opening H, as well as the opening I, closed, leaving the air-register L open to admit air to pass up through the grate P to the fire-pot to support combustion. As combustion takes place all the coal within the fire-pot becomes ignited, while that contained in the supplying-cylinder will be gradually heated and prepared for a more perfect combustion.

The gaseous products of combustion pass to the chamber G, thence to the chimney through the smoke-flue K. The volatile products, as before explained, of imperfect combustion accumulate so as to fill the interstices among the supply-coal, and thereafter aid in the proper action of the stove by keeping the point of combustion near the base, differing from this class of stoves as heretofore constructed for warming the air in buildings, inasmuch as its action (so far as to rapidity of combustion) can be controlled entirely by the air-supplying register L, and when overheated may be quickly cooled by opening the cover I to admit cold air to the chamber G″, thence to the vacuous space of the chimney-flue. The heating-surface, which forms the exterior case of the chamber receiving the poisonous products of combustion from the fire-pot, is constructed and adapted to other parts of the stove and in direct communication with the chimney, so as to form a vacuous chamber which can never be filled by the said products, and from which they consequently cannot escape to poison the atmosphere of the room; but, on the contrary, said vacuous heating-chamber not only gives a safe passage to the chimney for the poisonous products of combustion, but, owing to the fact that the opening I will be used more or less to regulate the action of the stove, it acts as a ventilator of the room in which such stove is placed, as thereby much air will be drawn off from the room in addition to that which may be required to support combustion of the fuel.

Hence, having fully described my invention, I wish it distinctly understood that I do not claim the combination of a fuel-supplying cylinder, fire-pot, and ash-pit with an inclosing-chamber to receive the products of combustion from the fire-pot and convey them to the chimney-flue, when the said supplying cylinder, fire-pot, and ash-pit are constructed in such a manner as to be separate and distinct from their inclosing-chamber so as to be removed therefrom and placed therein; but What I do claim as my invention, and desire to secure by Letters Patent, is—

The combination of a fuel-supplying cylinder with a fire-pot when the said supplying-cylinder has its cover-opening inclosed within a chamber or space communicating not only with the outlet from the fire-pot, but also with the exit-flue, substantially as herein described, when the case forming said inclosing-chamber becomes a part of the stove itself, and is so constructed, united, and combined with other parts of the stove as to form a complete manufactured article, or a structure having vitality as a complete individual thing for the combustion of anthracite and other concentrated fuel, substantially in the manner and for the purposes herein specified.

DENNIS G. LITTLEFIELD.

Witnesses:
CHARLES C. WILSON,
EDM. F. BROWN.